Dec. 22, 1964      F. A. QUIROZ      3,162,114
FRUIT JUICE EXTRACTION Original Filed June 12, 1962      4 Sheets-Sheet 1

Fig. 1

INVENTOR.
FRANCISCO ANGEL QUIROZ
BY
     Charles A. McClure
     ATTORNEY Dec. 22, 1964　　　F. A. QUIROZ　　　3,162,114
FRUIT JUICE EXTRACTION
Original Filed June 12, 1962　　　4 Sheets-Sheet 2

Fig. 2

INVENTOR.
FRANCISCO ANGEL QUIROZ
BY

ATTORNEY

Dec. 22, 1964  F. A. QUIROZ  3,162,114
FRUIT JUICE EXTRACTION

Original Filed June 12, 1962  4 Sheets-Sheet 3

INVENTOR.
FRANCISCO ANGEL QUIROZ
BY
Charles A. McClure
ATTORNEY

INVENTOR.
FRANCISCO ANGEL QUIROZ
BY
ATTORNEY

United States Patent Office
3,162,114
Patented Dec. 22, 1964

3,162,114
FRUIT JUICE EXTRACTOR
Francisco Angel Quiroz, 170 Eastern Parkway,
Newark, N.J.
Continuation of application Ser. No. 201,947, June 12, 1962. This application Oct. 15, 1963, Ser. No. 298,811
45 Claims. (Cl. 100—37)

This application is a continuation of my co-pending application Serial No. 201,947, filed June 12, 1962, now abandoned.

This invention relates to extraction of juice from fruit, especially from whole fruit having a surrounding rind, such as citrus fruit or the like.

Machines and methods are known for extracting juice from rinded fruit by compression of the fruit to express the juice therefrom. One such machine is covered by my U.S. Pat. 2,522,800. However, it has proved difficult to obtain a satisfactory yield of juice without at the same time contaminating the juice with oil or other extracts from the rind or with seeds or roughage from the interior of the fruit.

A primary object of the present invention is provision of a high yield of uncontaminated juice by compression of a whole fruit unbroken except at one or more excisions made to enable the juice to be expressed therefrom.

Another object is provision of apparatus for obtaining the desired high yield of uncontaminated juice from a succession of whole fruit fed, compressed, and ejected individually and automatically.

A further object is provision of electrical and mechanical elements and features for coordinating the steps performed and safeguarding the operation and product.

Other objects of this invention, together with means and methods for attaining the various objects, will be apparent from the following description of the invention and by reference to the accompanying diagrams of a preferred physical embodiment thereof.

In general, the objects of the present invention are accomplished, in the extraction of juice from fruit having a rind, by enclosing the whole fruit and supporting substantially its entire exterior surface, essentially one half thereof being rigidly supported and the other half thereof yieldably supported without significant surface deformation, excising a piece of rind from the rigidly supported half, and deforming the yieldably supported half to compress the fruit and thereby express the juice therefrom via the opening left by the excision of the piece of rind.

The invention comprehends, as specific means therefor, a rigid concave element and an opposing resilient concave element, the respective elements being adapted to be juxtaposed to enclose a whole fruit and support substantially the entire exterior surface thereof, the resilient concave element being adapted to fit within the rigid concave element.

Figure 1:
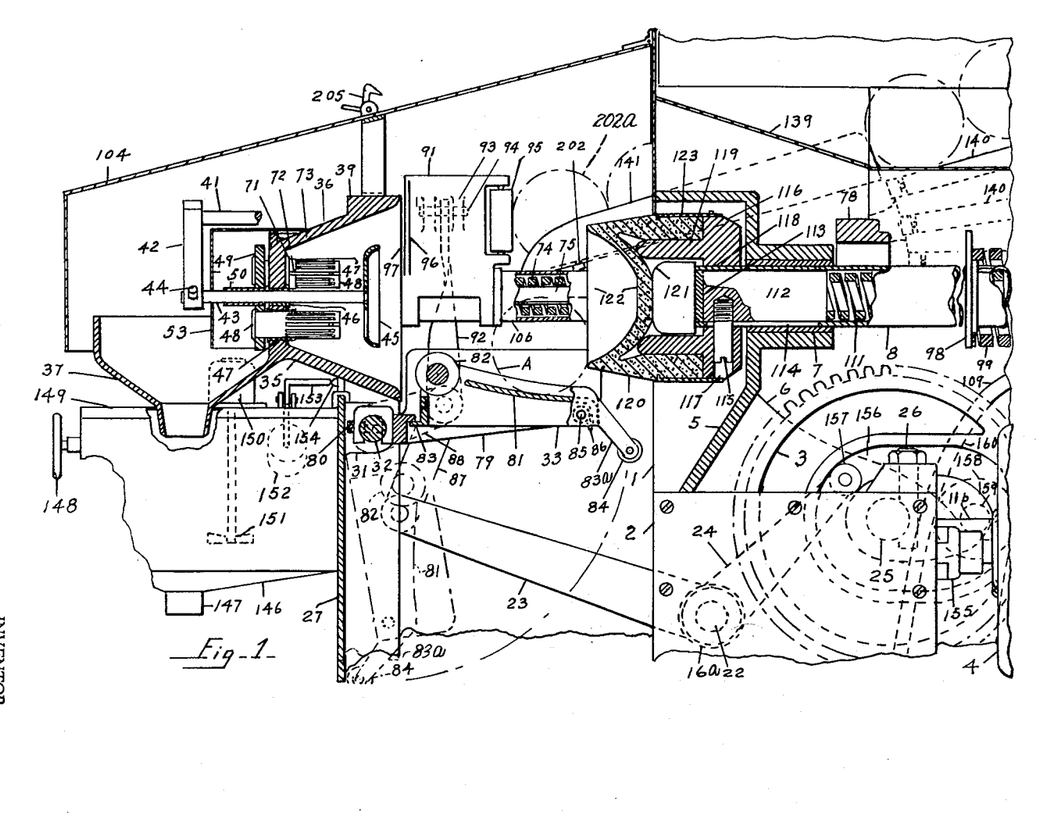
FIG. 1 is a central longitudinal sectional elevation of a portion of a machine embodying this invention, taken at 1—1 of FIG. 2.
Figure 2:
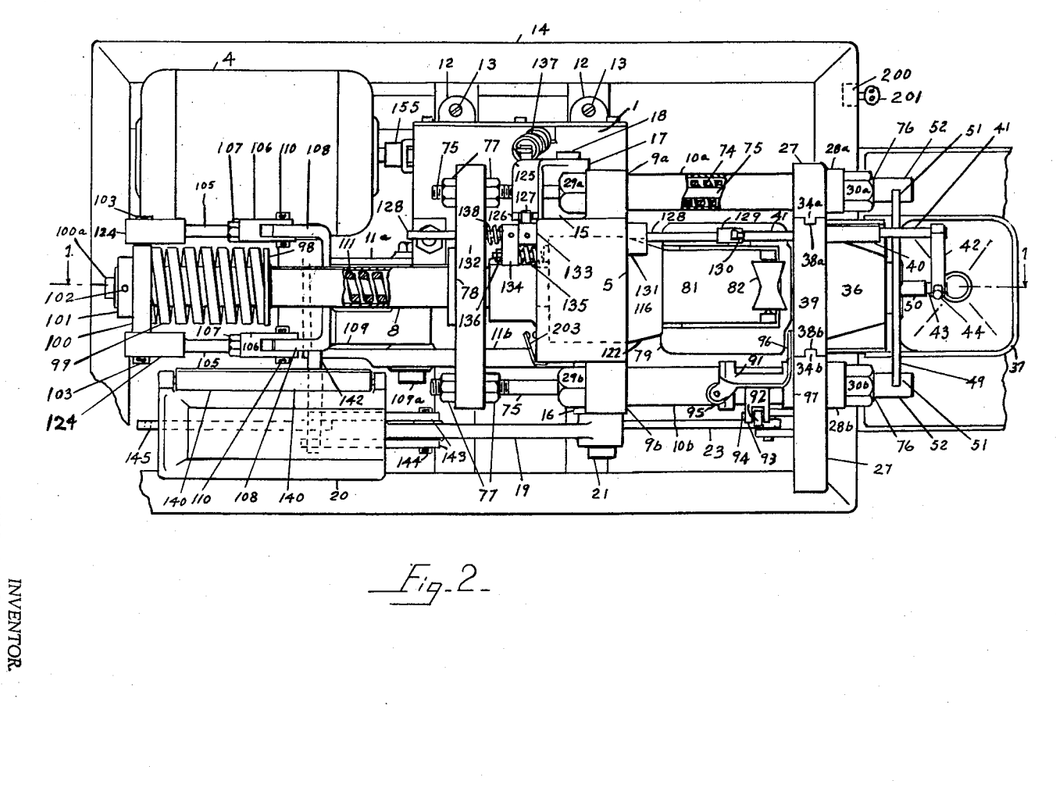
FIG. 2 is a plan view, on a smaller scale, of the machine of which part is shown in FIG. 1 but omitting certain covering elements thereof to reveal parts otherwise concealed thereby.

As can be seen from the comprehensive plan view in FIG. 2, and the more detailed sectional elevation in FIG. 1 (which is reversed end for end with regard thereto) and from subsequent views, the illustrated machine has frame 14 upon which are mounted drive motor 4 and the various elements driven thereby, as well as hopper 139 (shown fragmentarily in FIG. 1) for a supply of fruit (shown circular, in broken lines), funnel 37 and tank 146 with outlet spout 147 for juice, also various intermediate and associated elements. The fruit is interposed between opposing rigid concave conical element 36 and resilient concave element 120 and is enclosed and compressed thereby. Further mention of these components, as well as of tubular piercing and excising prongs 48 through which the juice is expressed (and other related elements) is deferred pending description of pertinent structural features.

Housing 1 has extending sideways therefrom bosses 12 secured to the frame by screws 13 and has upstanding bearing bracket 5 also formed integrally therewith and provided with reinforcing ribs 6. Fixed transverse bracket 27 upstanding from the frame, to which it is affixed, parallels the bearing bracket. Rails 34a, 34b extending toward one another on inwardly opposing vertical edges of the bracket fit in external grooves 38a, 38b of rigid concave element 36, which has a flat top or upper outside wall 39 flush with the top edge of bracket 27 and is slidably detachable as so provided. Funnel 37 is formed integrally with this slidably removable rigid concave element to facilitate cleaning of the resulting composite unit, designated generally as 35.

Fixed transverse bracket 27 bordering tank 146 and rising thereabove has bosses 28a, 28b spaced opposite (longitudinally of the machine) lateral bosses 9a, 9b on bearing bracket 5, and pair of tubes 10a, 10b are supported thereby and retained by nuts 29a, 29b at the bearing bracket and nuts 30a, 30b at the transverse bracket. Movable bracket 78 parallels the fixed transverse bracket, with the bearing bracket in between, and is flanked by pairs of nuts 77 threaded thereagainst on the ends of pair of bars 75, which extend (one each) through tubes 10a, 10b and terminate at their opposite ends in heads 52 having shoulders 76 resting against nuts 30a, 30b and adapted to be displaced therefrom upon movement of the movable bracket and the bars to compress springs 74 (one inside each tube). Such movement is occasioned, as described further below, upon contacting of the movable bracket by circular plate 98, which surrounds and is affixed to plunger tube 8 for which main bearing 7 (v. FIG. 2) is secured in a centrally located sleevelike extension of bearing bracket 5.

Figures 3, 4, 5, 6, 7, 8:
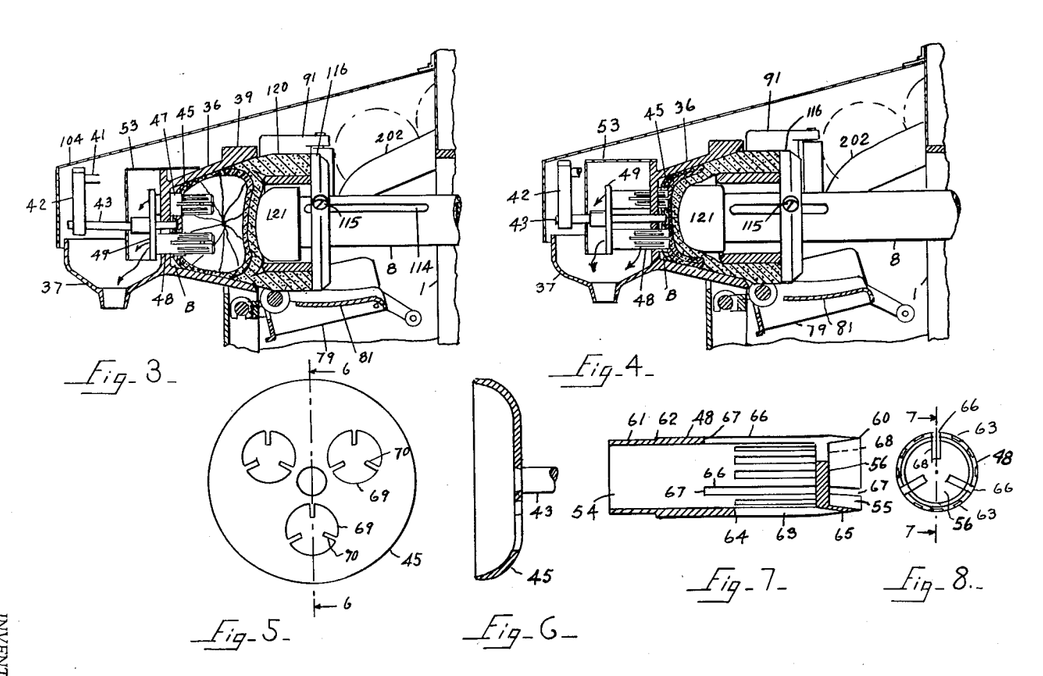
FIG. 3 is a central longitudinal, largely sectional elevation, on an intermediate scale, of certain of the elements shown similarly in FIG. 1, at an early stage in compression of a fruit.
FIG. 4 is a view similar to FIG. 3 but showing a terminal stage in the compression of a fruit.
FIG. 5 is a front or end elevation, on an enlarged scale, of a fruit-ejecting component of preceding views.
FIG. 6 is a central sectional elevation of the apparatus of the immediately preceding view, taken at 6—6 thereon.
FIG. 7 is a central longitudinal sectional elevation, on a considerably enlarged scale, of a fruit-piercing and excising component of preceding views, taken at 7—7 of FIG. 8.
FIG. 8 is a front or end elevation of the apparatus of the immediately preceding view.

Plunger tube 8 extending longitudinally above the frame carries resilient concave element 120, which has cuplike portion 122 with an external concave surface (opposing the conical surface of rigid concave element 36) and an integrally formed supporting cylindrical wall joining the cuplike portion along the periphery thereof and is tapered thereat at a smaller angle than the apex angle of the rigid concave element. The cylindrical wall of resilient material has a ringlike external support or collar 123 contiguous therewith affixed to supporting or holding unit 116. The holding unit has axial bore 118 accommodating the plunger tube and is retained by studs 115 through radial bores 117 therein threaded into solid cylinder 112 slidably located inside the plunger tube, which has slots 114 (v. FIG. 3) in it to accommodate the studs. The holding unit for the resilient concave element has a cylindrical projection 119 therefrom contiguous with the inside of the cylindrical wall of the resilient element, extending somewhat further than the external collar extends and terminating in contact with the rear face of the resilient cuplike portion.

One end of the solid cylinder 112 rests against plunger tube end wall 113, to which is affixed plunger 121, and the other end against compression spring 111 also located inside the plunger tube. The cylinder is slidable relative to the tube against the compression of the spring, whose other end bears against stud 102 (visible in FIG. 2), which also pins collar 101 to the end of the tube remote from end wall 113. Sliding bracket 100, which also surrounds the plunger tube, rests against this collar and against one end of surrounding helical spring 99, the other end of which bears against plate 98 affixed to the tube. The sliding bracket, which has a concealed roller running in channel 100a located parallel to and underneath the plunger tube, also has pair of round heads 103 extending oppositely laterally therefrom over which fit bored square heads 124 of pair of link bars 105 the other ends of which are threaded into the heads of clevises 106 and carry lock nuts 107 thereon. Yoke 108 on cam-operated arm 109 is secured to the clevises by pins 110 through the ends or fingers thereof.

As will be described further hereinafter, movement of cam-operated arm 109 is provided to draw yoke 108 and attached elements, including plunger tube 8, forward (to the right in FIG. 2, to the left in FIG. 1) until the tapered edge of the resilient concave element seats against the inner face of the rigid concave element (with a fruit enclosed therebetween), whereupon continued movement of the plunger, now against the compression of spring 111 inside the plunger tube, everts the cuplike portion of the resilient element inside the rigid concave element until the plunger can move forward no further, the remaining movement of the yoke compressing helical spring 99 as sliding bracket 100 leaves its rest position against collar 101. Near the forward end of the stroke, plate 98 against which spring 99 bears comes into contact with movable bracket 78, already described, and moves it forward against the compression of springs 74 (in tubes 10a, 10b), which bias it toward the illustrated position. Subsequent reversal of these movements restores the various elements to their original rest positions. Coordinated movements of other parts of the machine also occur, as will be described following description of those and related parts.

Located within the truncated conical space circumscribed by rigid concave element 36 is ejector disc 45, which is dished in the same direction and is centered axially thereof on shaft 43 slidably supported in bearing bushing 46 retained in the axially bored rigid concave element. This shaft also passes through bearing bushing 50 retained in adjacent transverse plate 49, which is supported in slots 51 in heads 52 on shafts 75 extending from previously described tubes 10a, 10b and accordingly is movable in the same direction thereas and relative thereto. Fixed to the plate and extending therefrom into the interior of the rigid concave element through larger bearing bushings 47 in bores provided therefor at equal intervals about the axis are the three tubular prongs 48, which act as piercing, excising, and ducting devices. The ejector disc is provided with three holes or apertures 69 aligned with the respective prongs to permit movement of the ejector disc and the prongs independently of one another.

FIGS. 5 and 6 show ejector disc 43 on an enlarged scale, in front (or end) and side sectional elevation, respectively. FIGS. 7 and 8 show, on an even further enlarged scale, tubular prong 48 in respective side sectional and front or end elevation. The orientation of the ejector disc in the side view of FIG. 6 is opposite to the orientation thereof where it is visible in other views and also opposite to the orientation of the prong in the side view of FIG. 7. Of course, apertures 69 in the ejector disc actually are commensurate in size with the prongs to permit sliding movement therebetween. Each aperture 69 has three evenly spaced radial fingers 70 extending inward about half a radius to ride in long slots 66 of each prong, which extend from cutting edge 60 of the prong and longitudinally for a major portion of the length thereof.

Each prong 48 also has a plurality of short longitudinal slots 63 therethrough between and spaced from the long slots, the short slots extending from ends 65 near the cutting edge and terminating with their bases 64 short of bases 67 of the long slots. Bearing bushings 47 for the prongs have small slots 72 matching the base portion of long slots 66 of the prongs to receive fingers 70 of ejector disc 45 as further described.

Near the cutting edge each prong 48 has transverse wall 56 with radial indentation 68 where it is traversed by long slots 66. Recess 55, defined between the transverse wall and the cutting edge, increases slightly in diameter from the former to the latter. Each prong has at the end remote from the cutting edge necked portion 61 inserted in plate 49 to a depth determined by shoulder 62 and secured thereto.

Shaft 43 of ejector disc 45 is fastened to bar 42 by taper pin 44, and the bar connects to shaft 41, which fits slidably through tube 40 retained in the external wall portion of rigid concave element 36. The far end of the shaft has circumferential groove 130 for readily detachable interconnection with lugs on square head 129 of shaft 128, which extends through boss 131 on bearing bracket 5 and entirely through the bearing bracket and through an aligned bearing 132 on movable bracket 78. Pinned to shaft 128 between the bearing bracket and movable bracket are block 133 and adjacent block 134, with bumper spring 138 surrounding the shaft between block 134 and the movable bracket. Block 134 has attached thereto spring-loaded stud assembly 135, which comprises a headed stud extending parallel to shaft 128 through an opening in bearing bracket 5 and terminating with its head near the rear wall of holding unit 116 for resilient concave element 120 and having a surrounding compression spring, being retained by nut 136 on the opposite threaded end of the stud. Block 133 has stud 127 extending laterally therefrom, shown further in FIGS. 10 and 11.

As shown in the last mentioned views, stud 127 is located in U-shaped end 126 of arm 125 of ejector lever 17, which is retained pivotally by bolt 18 into boss 15 (v. FIG. 2) on the housing. Extension spring 137 is attached at one end to the lever arm and at the other end to one of a series of holes in a flange on the housing to provide a bistable or flip-flop assembly. In one position of the ejector lever, ejector disc 45 is located near the open end of rigid concave element 36 (as shown in FIG. 1), while in the other position the ejector disc lies near the inside surface of the truncated apex of the rigid concave element (as shown in FIGS. 3, 4, 12, and 13) with the dished peripheral portion of the disc contiguous with conical interior wall 73 thereof, their adjacent flat surfaces being spaced apart slightly, by seating of the disc on shoulders 71 of bearing bushings 47 for prongs 48, and defining annular channel-like space B therebetween.

Figures 9, 10, 11:
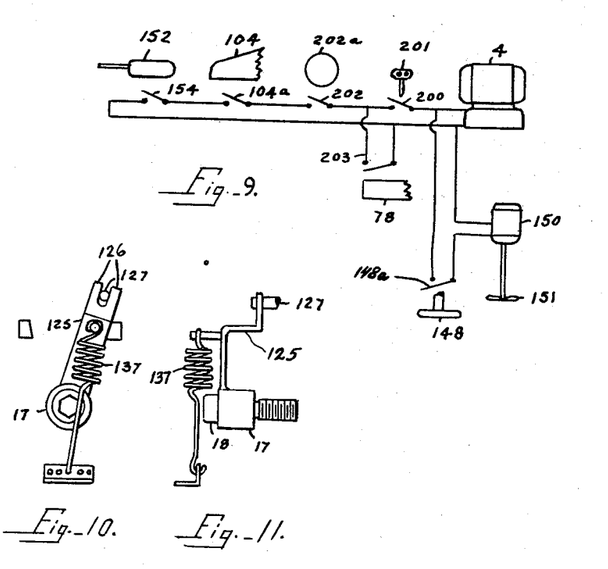
FIG. 9 is a diagrammatic representation of electrical components of the same machine.
FIG. 10 is a side elevation, on a considerably enlarged scale, of a bistable component partly visible in FIG. 2.
FIG. 11 is a rear elevation of the apparatus of the immediately preceding view.

These extreme positions correspond to the two extreme positions (one of which appears in FIG. 10) of the ejector lever and lever arm, stops for which are indicated diagrammatically in FIG. 10 by unnumbered trapezoidal blocks.

Aligning device 33 for fruit to be compressed is shown located at the lower edge of the space separating opposing rigid and resilient concave elements 36 and 120. The aligning device is secured at bracket 79 thereof by taper pin 80 to transverse shaft 32, which is retained pivotally in bosses 31 (one visible in FIG. 1) on the housing. The bracket has affixed to it bar 85, which extends horizontally parallel to shaft 32 and pivotally supports aligning plate 81. Spring 86 about the shaft biases the aligning plate upward to bring lip 83 thereof into contact with a cooperating lip on the bracket. Extension 83a of the aligning plate terminates in roller 84, mentioned further below. Mounted rotatably on the aligning plate is horizontal idler roller 82, which is necked in the middle.

Cooperating with aligning plate 81 and related elements, and (like them) normally concealed by cover 104, is feeder plate 91 shown thereabove (and to one side) in FIGS. 1 and 2. The feeder plate is mounted pivotally on tube 10b and carries vertical idler roller 95 above the tube and near the lower end of channel 141, which leads from hopper 139. Flange 96 extends perpendicularly thereto along the edge that is nearest flared edge 97 of the rigid concave element to shield it and thereby prevent jamming of fruit thereagainst. Fork 93 on the feeder plate flanks the upstanding end of link 92 and retains it by means of pin 94 therethrough, the other end of the link being secured pivotally (after a quarter twist) to short lever 88 secured to transverse shaft 32. Link bar 87 connects the short lever to one end of long lever 23, the other end of which is secured to shaft 22 mounted for rotation in housing boss 16a and is affixed in bell-crank fashion to cam lever 24. The end of the cam lever carries cam roller 157, which rides in cam track 156 on cam gear 3. Upon rotation of the cam gear the feeder plate swings between the illustrated vertical position and a horizontal position (not shown) opposite the end of the hopper (shown fragmentarily), and the aligning plate swings between the position shown in solid lines and a lower position (shown in broken lines) in which roller 84 on extension 83a thereof comes into contact with the vertical wall of fixed transverse bracket 27.

Fruit lifter 20 (lower left, FIG. 2) is affixed to one end of lever 19, whose other end is mounted pivotally on bolt 21 threaded into boss 16 on the housing. The lever is provided with an intermediate transverse bore through which pin 144 secures flanking link bars 143. The other ends of the link bars flank agitator arm 145 and are pivoted to shaft 142 (affixed to cam-operated arm 109) and thereby secured together. The other end of the agitator arm is operatively connected to an agitator device (not shown) that is moved thereby in the hopper to agitate the fruit sufficiently to ensure a continuing supply from the hopper to the lifter and thence to the channel into the housing. The fruit lifter has a plurality of idler rollers 140 mounted on the side thereof to prevent jamming of the fruit as the lifter moves to select fruit to be fed to the channel.

Cam-operated arm 109 is mounted for rocking movement on bolt 109a (FIG. 2) secured to the housing. This arm is provided on one side with curved channel 160 accommodating larger cam roller 158, which is carried on shaft 159 secured to one side of cam gear 3, the other side of which has cam track 156 accommodating smaller roller 157 on the end of cam lever 24. The cam gear is mounted for rotation on shaft 25, which is secured by clamp bolt 26 and interconnected to drive motor 4 through a conventional speed-reduction assembly (not shown) contained in gearbox 3 of the housing, which has a crankcase formed by side walls 11a, 11b and connecting concealed bottom and transverse walls.

Operation of the illustrated and described machine is readily understood. Upon energization of the drive motor the cam gear rotates and causes the respective moving parts to move in properly timed coordination. Cam-operated arm 109 actuated from one side of the cam gear actuates fruit lifter 20 to receive a fruit from hopper 140 and deposit it in channel 141, down which it rolls to feeder plate 91. The feeder plate, actuated from the other side of the cam gear through bell-crank levers 23, 24, swings to its horizontal position to receive a fruit thereon and then tips up to deposit the fruit, as shown at A, onto roller 82 and thence onto aligning plate 81 when opposing rigid and resilient concave elements 36 and 120 are spaced apart. The aligning plate pivots on supporting bar 85 against the bias of spring 86 to an extent dependent upon and determined by the weight of the fruit to position the fruit axially between ejector disc 45 (in the forward position) and cuplike portion 122 of the resilient concave element. Then the plunger tube, also actuated through cam-actuated arm 109, moves forward to contact the fruit and force it against the ejector disc and into the interior of the rigid concave element, thereby supporting substantially the entire exterior surface of the fruit. The alinging plate, actuated through levers 23 and 24, swings downward out of the way of the advancing resilient concave element.

As ejector disc 45 is forced gradually further into the interior of the rigid concave element by continuing movement of the resilient concave element and interposed fruit, interconnected shafts 43 and 41 move longitudinally in the same direction, and tubular prongs 48 become exposed through apertures 69 in the ejector disc and pierce the near side of the fruit rind. At this time spring 137 on arm 125 of ejector lever 17, which is pivoting by virtue of interconnection with shaft 128 through stud 127 and block 133 pinned to the shaft, passes through its position of greatest extension and rotates the lever to an extreme position, in which the travel of the shafts is limited by bottoming of the ejector disc at the truncated interior end of the rigid concave element, with the dished peripheral edge of the disc contiguous with the conical interior wall.

Continued advancing of resilient concave element 120 by continuing advance of the plunger tube forces the fruit further onto the tubular prongs, each of which excises a disc-shaped piece or plug of rind and retains it, in recess 55 defined between transverse wall 56 and the cutting edge, as the slotted portion of the prongs becomes fully embedded in the fruit. At this stage the edge of the rind about each excision location is sealed by contact with one of bearing bushings 47 surrounding the base of the respective prongs, which are still fully extended. Further advancing of the plunger tube everts cuplike portion 122 of the resilient element by forcing plunger 121 against the rear face thereof, compressing spring 111 inside the plunger tube as supporting unit 116, which can advance no further, halts attached solid cylinder 112 inside the end of the advancing plunger tube.

As one half of the fruit is everted from convex to concave, the decrease in volume thereof expresses the juice therefrom through the slots in tubular prongs 48, which conduct the juice through bore 54 of each to the exterior of the rigid concave element over funnel 37, into which the juice is directed by splash shield 53, and through the funnel into tank 146. During the eversion, plate 98 on the advancing plunger tube comes into contact with movable bracket 78 at a time when the prongs are nearing the rind at the opposite side of the fruit and, by moving bars 75 whose heads 52 carry plate 49 to which the prongs are affixed, retracts the prongs at the same rate as the plunger advances, thereby avoiding piercing of that side of the rind.

When cuplike portion 122 of the resilient element and the adjacent half of the fruit have been everted as completely as possible, as shown in FIG. 4, continued advancing movement of cam-operated arm 109 compresses spring 99 surrounding plunger tube 8, while the plunger dwells in the illustrated position for a short time until the arm begins the withdrawing or retrograde portion of its stroke. The arm is cammed, by travel of roller 158 in a straighter part of channel 160 in the arm nearer the fulcrum, to return to its original position, in which resilient concave element 120 is again spaced apart from rigid concave element 36. As plunger 121 retracts, cuplike portion 122 of the resilient element resumes its externally concave configuration, then supporting unit 116 withdraws, withdrawing the resilient element from within the rigid concave element and spacing them apart. During this withdrawal the rear wall of the supporting unit comes into contact with spring-loaded stud assembly 135, which protrudes in appropriate position through an opening in the housing bearing bracket, moving shaft 128 to throw interconnected ejector lever to its other extreme position, the extent of throw being limited by contact of bumper spring 138 with movable bracket 78.

Because of the curvature of channel 160 of arm 109 in which roller 158 of cam gear 3 operates, the forward movement imparted to plunger tube 8 starts slowly at the beginning of the stroke and moves more slowly at the end of the stroke owing to the increased curvature of channel 160, as spring 99 begins to compress to put more power in the squeezing action, and thereby allows plunger 121 to dwell for a moment so as to ensure expression of most of the juice from the fruit. The backward stroke is faster, as during it roller 158 operates in the straighter part of the channel nearer to the fulcrum of the arm, taking only the time in which the cam gear rotates about one hundred twenty degrees.

When extension spring 137 passes dead center on this return throw the tubular prongs have been returned to their original, projected position, and the remnant or residue of the compressed fruit, which in transverse section resembles a crescent or new moon, is impaled near the cutting ends thereof where it was forced when the prongs retracted to avoid cutting clear through it. Spring 137 contracts suddenly and snaps ejector disc 45 back to its original extended or forward position past the cutting ends of the prongs, abruptly propelling the fruit residue off the prongs axially in the direction in which the resilient concave element withdrew. Under the combined influence of gravity and the ejecting force the fruit residue is expelled from between the opposing rigid and resilient elements and into a waste receptacle (not shown) located thereunder. The excised pieces of rind are removed together with (still inside) the fruit by fingers 70 on the ejector disc traversing slots 66 in the prongs. The wiping action of the fruit residue over the prongs removes seeds and roughage retained from passing through the slots. Also, movement of the ejector disc away from the truncated apex of the rigid concave element, where it defined annular space B therewith, permits oil or other rind extracts and contaminated juice segregated therein to run down conical interior wall 73 into the same waste receptacle.

After ejection of the fruit residue, aligning plate 81 returns to its original horizontal position, and feeder plate 91 swings down to horizontal position to receive another whole fruit and then swings up to deposit it on the aligning plate, whereupon the entire cycle just described is repeated. The machine will recycle until the supply of fruit is exhausted or until something else occurs to interrupt the drive motor circuit, shown diagrammatically in FIG. 9. Key 201 operates main switch 200, located in any convenient place. The presence of a fruit 202a near the end of the channel from the hopper is effective to close cut-off switch 202; in the absence of fruit in the channel the machine will cease to operate so as to avoid running after the supply of fruit is exhausted. Unless cover 104, which may be tipped upward and then secured to the housing by clamp 205, is in place to close interlock switch 104a the exposed machine will fail to operate, so as to prevent personal injury or machine damage as might occur if someone was working on the exposed parts in the absence of safety precautions. Float 152 in juice tank 146 actuates limit switch 154 by lever 153 to prevent continued expression of juice after the tank is full.

All the above mentioned switches are connected in series so that opening of any one of them opens the motor circuit, except for possible closing of the circuit by switch 203 located in a parallel branch of the circuit. Switch 203 is closed by contact with movable bracket 78 when the plunger is so far forward that cuplike portion 122 of resilient element 120, which is normally concave on its external surface opposing rigid concave element 36, is everted into externally convex configuration. This ensures that the motor will run long enough to space the rigid and resilient elements apart, permitting the cuplike portion of the resilient element to resume its normal shape even though the machine is otherwise deactivated by opening of one of the aforementioned switches. Of course, switch 203 opens as the movable bracket is returned to its original position by springs 74 in tubes 10a, 10b when plunger tube 8 is withdrawn, withdrawing the plunger from the everted cuplike element.

Tank 146 is provided with handwheel 148, which controls a concealed valve to regulate the outflow of juice through spout 147; in the open position of the valve (handwheel in), switch 148a closes to actuate motor 150 and agitator 151 operated thereby so as to keep the juice in the tank well stirred, thereby preventing settling of pulp therein. Of course, the juice in the tank contains only a small amount of pulp because coarse roughage cannot pass through the slots in prongs 48. The stirring also helps maintain the homogenized condition of the juice, which has come about through the high-pressure expression of the juice and fine pulp from the fruit and straining of it through the slots.

Figure 12:
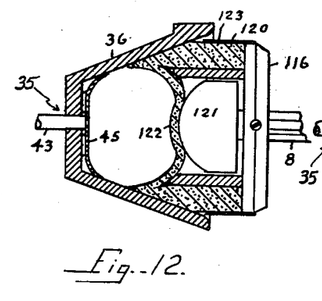
FIG. 12 is a central longitudinal sectional elevation of enclosing and compressing components of preceding views, on the same scale as FIG. 1, at an early stage in compression of a small fruit.
Figure 13:
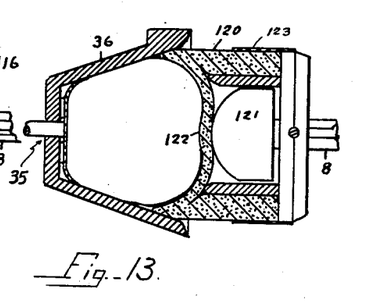
FIG. 13 is a view similar to FIG. 12 but showing accommodation of a much larger fruit.

Without change the machine can accommodate fruit within a wide range of sizes, such as from the size of a lemon or small orange to that of a small grapefruit or large orange, as best shown in FIGS. 12 and 13. The outer edge of resilient concave element 120 being smaller in diameter than the greatest inside diameter of rigid concave element 36 (and tapered, at a somewhat smaller angle), fits therein and slides along conical interior wall 73 thereof until the fruit, regardless of its size, is supported without significant surface deformation over substantially its entire exterior surface by that wall, ejector disc 45 (retracted to the truncated conical apex thereof), and cuplike portion 122 of the resilient concave element. This prevents rupturing of the rind even at the highest degree of compression and ensures expression of a maximum amount of juice and a minimum amount of oil or other extract from the rind, which remains unbroken except where excised by prongs 48. Annular space B provides low-pressure accommodation for whatever rind oil may be expressed outside the entering prongs and minor leakage of juice and oil before or after the excision locations are practically sealed by bearing bushings 47 around the prongs. Essentially the same enclosing and supporting, as well as rind-excising and juice-expressing, action takes place with the small fruit of FIG. 12 and the large fruit of FIG. 13.

All the components that come into contact with juice or rind oil are readily removable for cleaning when cover 104 is lifted, as has been suggested above and is further apparent from the construction of the apparatus. The size, shape, and interconnection of the various parts may be varied, and parts combined or subdivided, while retaining all or many of the evident benefits and advantages of this invention, some of which have been mentioned above and others of which will become apparent and accrue to those undertaking to practice the invention as defined, in the light of the present teaching.

I claim:

1. In extraction of juice from fruit having a rind, the improvement comprising enclosing a whole fruit and supporting substantially its entire exterior surface, essentially one half thereof being rigidly supported and the other half thereof yieldably supported without significant surface deformation, excising a piece of rind from the rigidly supported half, and deforming the yieldably supported half to compress the fruit and thereby express the juice therefrom via the opening left by the excision of the piece of rind.

2. In extraction of juice from fruit having a rind, the improvement comprising enclosing a whole fruit and supporting substantially its entire exterior surface, essentially one half thereof being rigidly supported and the other half thereof yieldably supported without significant surface deformation, excising a piece of rind from the rigidly supported half, ducting the interior to the exterior via the opening left by the excision of the piece of rind, and deforming the yieldably supported half to compress the fruit and thereby express the juice therefrom free of contact with the rind surrounding the opening.

3. In extraction of juice from fruit having a rind, the improvement comprising enclosing a whole fruit and supporting substantially its entire exterior surface, essentially one half thereof being rigidly supported and the other half thereof yieldably supported without significant surface deformation, excising a piece of rind from the rigidly supported half and placing it in the interior of the fruit, providing a duct to the exterior from the opening left by the excising of the piece of rind, and deforming the yieldably supported half to compress the fruit and thereby express the juice therefrom into the duct.

4. In extraction of juice from fruit having a rind, the improvement comprising enclosing a whole fruit and supporting substantially its entire exterior surface, essentially one half thereof being rigidly supported and the other half thereof yieldably supported without significant surface deformation, excising a plurality of pieces of rind from the rigidly supported half, providing a corresponding plurality of ducts to the exterior from the openings left by the excision of the pieces of rind, deforming the yieldably supported half from the center outward and toward the rigidly supported half to compress the fruit and thereby express the juice therefrom into the ducts.

5. In extraction of juice from fruit having a rind, the improvement comprising enclosing a whole fruit and supporting substantially its entire exterior surface, essentially one half thereof being rigidly supported and the other half thereof yieldably supported without significant surface deformation, excising a plurality of pieces of rind from the rigidly supported half adjacent an annular channel-like space covered thereby and placing them in the interior of the fruit, providing a corresponding plurality of ducts from the interior to the exterior via the openings, and deforming the yieldably supported half to compress the fruit and thereby express the juice therefrom into and through the ducts and any extract from the edges of the rind about the openings into the annular channel-like space, from which it may be removed upon removal of the fruit.

6. In extraction of juice from fruit having a rind, the improvement comprising positioning a fruit at a level dependent upon its weight, enclosing the whole fruit at that level and supporting substantially its entire exterior surface, excising a piece of rind therefrom, and deforming the exterior surface to compress the fruit and thereby express the juice therefrom via the opening left by the excision of the piece of rind.

7. In extraction of juice from fruit having a rind, the improvement comprising enclosing a whole fruit and supporting substantially its entire exterior surface essentially one half thereof being rigidly supported and the other half thereof yieldably supported without significant surface deformation, excising a piece of rind from the rigidly supported half, everting the yieldably supported half of the rind by applying a deforming force to the exterior surface thereof progressively from the center outward to compress the fruit and thereby express the juice therefrom via the opening left by the excision of the piece of rind, removing the deforming force progressively from the periphery inward, opening the enclosure, and propelling the residue of the fruit forcibly opposite to the direction in which the deforming force was applied and away from the enclosure location.

8. In extraction of juice from fruit having a rind, the improvement comprising enclosing a whole fruit and supporting substantially its entire exterior surface, essentially one half thereof being rigidly supported and the other half thereof yieldably supported without significant surface deformation, excising a plurality of pieces of rind from the rigidly supported half, all at locations spaced about the axis joining the center thereof to the center of the yieldably supported half, and everting the yieldably supported half of the rind by applying a deforming force to the exterior surface thereof progressively from the center outward to compress the fruit and thereby express the juice therefrom via the openings left by the excision of the pieces of rind.

9. In extraction of juice from fruit having a rind, the improvement comprising enclosing a whole fruit and supporting substantially its entire exterior surface, between opposing concave rigid and resilient elements, essentially one half thereof being rigidly supported and the other half thereof yieldably supported without significant surface deformation, excising a piece of rind from the rigidly supported half, and everting the resilient element to convex shape to compress the fruit and thereby express the juice therefrom via the opening left by the excision of the piece of rind.

10. In extraction of juice from fruit having a rind, the improvement comprising enclosing a whole fruit and supporting substantially its entire exterior surface, between opposing concave rigid and resilient elements, essentially one half thereof being rigidly supported and the other half thereof yieldably supported without significant surface deformation, excising a plurality of pieces of rind from the rigidly supported half, all at locations spaced about the axis joining the center thereof to the center of the yieldably supported half, and everting the resilient element to convex shape by applying a deforming force to the exterior surface thereof progressively from the center outward to compress the fruit and thereby express the juice therefrom via the openings left by the excision of the pieces of rind.

11. In extraction of juice from fruit having a rind, the improvement comprising positioning a fruit at an enclosing location between opposing concave rigid and resilient elements, thereby enclosing the whole fruit, essentially one half thereof being rigidly supported and the other half thereof yieldably supported without significant surface deformation, excising a piece of rind from the rigidly supported half, everting the resilient element to convex shape to compress the fruit and thereby express the juice therefrom via the opening left by the excision of the piece of rind, opening the enclosure by withdrawing the resilient element, which thereupon resumes its concave shape, and propelling the residue of the fruit forcibly away from the rigid concave element in the direction of withdrawal of the resilient element.

12. In apparatus for extracting juice from fruit by compression thereof, the improvement comprising a rigid concave element and an opposing resilient concave element adapted to be juxtaposed to enclose a whole fruit and support substantially the entire exterior surface thereof without significant surface deformation, the resilient concave element being adapted further to be everted to conform generally to the rigid concave element and to fit therein, thereby compressing the fruit and deforming it likewise.

13. In apparatus for extracting juice from fruit by compression thereof, the improvement comprising opposing concave rigid and resilient elements adapted to be juxtaposed to enclose a whole fruit and support substantially the entire exterior surface thereof, the resilient concave element including a cup-like body portion and a hollow cylindrical supporting wall portion of resilient material joining the peripheral part of the body portion, the maximum external diameter thereof being exceeded by the maximum internal diameter of the rigid concave element.

14. In apparatus for extracting juice from fruit by compression thereof, the improvement comprising opposing concave rigid and resilient elements adapted to be juxtaposed to enclose a whole fruit and support substantially the entire exterior surface thereof, the resilient element having an external concave body portion and a hollow cylindrical supporting wall portion of resilient material with its external diameter exceeded by the maximum internal diameter of the rigid concave element, and means for juxtaposing the respective elements and for everting the concave body portion of the resilient element into the rigid concave element.

15. In apparatus for extracting juice from fruit by compression thereof between opposing concave elements adapted to enclose a whole fruit therebetween and thereby support substantially the entire exterior surface thereof, the improvement comprising a resilient concave enclosing and supporting element as one of the opposing concave elements and adapted to enter the concavity of the other opposing element, including a hollow cylindrical supporting wall of resilient material joined to the peripheral edge of the resilient concave element and having a substantially coaxial rigid cylindrical support contiguous therewith.

16. In apparatus for extracting juice from fruit by compression thereof between opposing concave elements adapted to enclose a whole fruit therebetween and thereby support substantially the entire exterior surface thereof, the improvement comprising a resilient enclosing and supporting element as one of the opposing concave elements and adapted to enter the concavity of the other opposing element, having a body portion with an external concave face and a hollow cylindrical supporting wall portion joined to the peripheral edge of the concave face, together with means located within the resilient cylindrical wall portion and adapted to evert the body portion to compress a fruit adjacent thereto and adapted also to permit the body portion to return to its externally concave configuration.

17. In apparatus for extracting juice from fruit by compression thereof between opposing elements adapted to enclose a whole fruit therebetween and thereby support substantially the entire exterior surface thereof, one of the opposing elements being a rigid concave element having a conical internal taper, the improvement comprising a resilient concave enclosing and supporting element including a hollow cylindrical supporting wall of resilient material with its external diameter exceeded by the maximum internal diameter of the rigid concave element, and having at its external edge adjacent the junction of the supporting wall with the concave portion of the element a conical external taper in the same direction as and with the angle of taper thereof at most equal to the angle of conical internal taper of the rigid concave element.

18. In apparatus for extracting juice from fruit, the improvement comprising opposing concave rigid and resilient elements mounted for relative reciprocating movement, means for positioning a whole fruit therebetween, means for juxtaposing the respective concave elements to enclose and thereby support substantially the entire exterior surface thereof without significant surface deformation, means for piercing the portion of rind supported by the rigid concave element, means for everting the resilient element to convex shape to compress the fruit and thereby express the juice therefrom via the opening left by the piercing of the rind, means for spacing the opposing elements apart from one another, and means for ejecting the residue of the fruit from between the opposing elements when spaced apart from one another.

19. In apparatus for extracting juice from fruit, the improvement comprising opposing concave rigid and resilient elements mounted for relative reciprocating movement, means for positioning a whole fruit therebetween, means for juxtaposing the respective concave elements to enclose and thereby support substantially the entire exterior surface thereof without significant surface deformation, means for excising a piece of rind from the portion thereof supported by the rigid concave element, means for everting the resilient element to convex shape to compress the fruit and thereby express the juice therefrom via the opening left by the excision of the piece of rind, means for spacing the opposing elements apart from one another, and means for ejecting the residue of the fruit from between the opposing elements when spaced apart from one another.

20. In apparatus for extracting juice from fruit by compression thereof between opposing elements adapted to be juxtaposed to enclose a whole fruit therebetween and thereby support substantially the entire exterior surface thereof, one of the elements being a rigid concave element, the improvement comprising ejector means axially movable within the rigid concave element, fruit-piercing means axially movable with respect to the ejector means and the rigid concave element, bistable means for actuating the ejector means with a pair of extreme positions of maximum stability corresponding to location of the ejector means in a non-ejecting position near the inner face and in an ejecting position further from the inner face of the rigid concave element, and coordinating mechanism effective to move the bistable means between its two stable positions in accordance with juxtaposition and separation of the opposing fruit-enclosing elements to locate the ejector means abruptly in the non-ejecting position when the elements are juxtaposed and in the ejecting position when they are separated.

21. In apparatus for extracting juice from fruit by compression thereof between two relatively movable means adapted to enclose the fruit, the improvement comprising tubular means adapted to pierce the rind of the fruit, having a peripheral cutting edge at one end adapted to excise a piece of rind, having a transverse wall recessed from the cutting edge and adapted to receive the excised piece of rind thereagainst, and having openings in its longitudinal wall to admit juice from the compressed fruit, the portion of the longituidnal wall between the transverse wall and the cutting edge tapering inward on its exterior surface toward the cutting edge, and ejecting means engageable with the compressed fruit and mounted for movement in a direction to remove the compressed fruit from the region of the piercing means, the piercing means being provided with a plurality of longitudinal slots therethrough, and the ejecting means comprising a plurality of fingers extending through the slots and adapted to move therealong.

22. In apparatus for extracting juice from fruit by compression thereof between two relatively movable means adapted to enclose the fruit, the improvement comprising tubular means adapted to pierce the rind of the fruit, having a peripheral cutting edge at one end adapted to excise a piece of rind, having a transverse wall recessed from the cutting edge and adapted to receive the excised piece of rind thereagainst, and having openings in its longitudinal wall to admit juice from the compressed fruit, the portion of the longitudinal wall between the transverse wall and the cutting edge tapering inward on its exterior surface toward the cutting edge, and ejecting means engageable with the compressed fruit and mounted for movement in a direction to remove the compressed fruit from the region of the piercing means, the piercing means being provided with a plurality of longitudinal slots therethrough, and the ejecting means comprising a disc surrounding the piercing means and a plurality of fingers extending from the disc and through the slots, the ejecting means being adapted to move longitudinally with respect to the piercing means.

23. In apparatus for extracting juice from fruit by compression thereof between two relatively movable means adapted to enclose the fruit, the improvement comprising a plurality of longitudinally movable tubular prongs adapted to pierce the rind of the fruit, each prong having longitudinal slots therethrough to admit juice from the fruit and to strain out seeds and roughage, having a peripheral cutting edge at one end adapted to excise a piece of rind, having a transverse wall recessed from the cutting edge and adapted to receive the excised piece of rind, the recess flaring outward from the transverse wall to the cutting edge, certain of the slots also traversing the transverse wall; an ejecting disc engageable with the interior surface of one of the fruit-enclosing means and the compressed fruit, bored to be traversed by the prongs and separately movable to and fro in a like direction, and having fingers extending therefrom adapted to ride in the slots traversing the transverse wall of the prongs; and means for reciprocating the prongs and the ejector disc separately with respect to one another and with respect to the fruit-enclosing means.

24. Apparatus for extracting juice from fruit, comprising two relatively movable means between which a whole fruit may be enclosed and be subjected to compression with substantially its entire exterior surface supported thereby without significant surface deformation, one of those two means comprising a concave conical element of rigid material, the other of those two means comprising a cuplike element of relatively resilient material adapted to fit and be compressed inside the concave conical element, means adapted to compress and thereby evert the cuplike element from concave form to convex form inside the concave conical element with the fruit therebetween, drive mechanism for effecting a relative approaching and separating movement between the two relatively movable means and thereby alternately juxtaposing them to enclose and compress a fruit therebetween and spacing them apart to permit ejection of the residue of a compressed fruit, means for transferring fruit one by one from a source of supply and positioning them between the two relatively movable means when spaced apart for compression therebetween, and ejection mechanism synchronized therewith to eject the residue of one fruit therefrom before the transfer means positions another fruit to be enclosed and compressed therebetween.

25. Apparatus for extracting juice from fruit having a rind, comprising two relatively movable means between which a fruit may be interposed, including a concave conical element of rigid material and an opposing concave element of resilient material, means mounting them for relative approaching and separating movement and for juxtaposing them to enclose a whole fruit therebetween and to support substantially the entire exterior surface thereof without significant surface deformation, the concave conical element having projecting thereinto from the vicinity of the apex thereof tubular means adapted to pierce the rind at the adjacent side of the fruit compressed thereagainst and to strain juice expressed therefrom during compression thereof, means for effecting relative approaching movement thereof to impale the interposed fruit upon the tubular piercing means and to compress the fruit therebetween after juxtaposition thereof, means for gradually everting the resilient member from concave to convex form during the compression of the fruit, and means for giving the tubular piercing means retrograde movement relative to the fruit and the concave conical element during the continued compression of the fruit to prevent piercing of the rind thereby on the side of the fruit that is engaged by the opposed resilient member, the juice being expressed through the tubular means essentially free of oil, seeds, and roughage.

26. Apparatus for extracting juice from fruit having a rind, comprising two relatively movable means between which a fruit may be interposed, including a concave conical element of rigid material and an opposing concave element of resilient material, means mounting them for relative approaching and separating movement and for juxtaposing them to enclose a whole fruit therebetween and to support substantially the entire exterior surface thereof, the concave conical element having therein and adapted to project thereinto from the vicinity of the apex thereof disc-like fruit-constraining means adapted to assist in holding the interposed fruit prior to juxtaposition of the two enclosing and supporting elements and further adapted to withdraw to the apex upon continued relative approaching movement after juxtaposition thereof, means for effecting such continued relative approaching movement thereof to compress the interposed fruit and express juice from the fruit, and means for giving the fruit-constraining means projecting movement relative to the fruit and the concave conical element after separation of the fruit-enclosing elements following compression of the fruit so as to eject the compressed fruit residue.

27. Apparatus for extracting juice from fruit by compression thereof, comprising a housing, drive means including a rotatable cam member mounted in the housing, a lever arm member fulcrumed in the housing and operatively connected to the cam member to undergo a reciprocating movement that slows down toward the forward or compression stroke and gives the lever arm dwelling time at the end of that stroke, a plunger tube bearing-mounted in the housing and having connecting linkage at one end to engage the lever arm and impart like reciprocating movement to the plunger tube, a spring located inside of the plunger tube, a sliding member mounted at the other end of the plunger tube and bearing against the spring, a rigid concave conical element, a resilient concave-faced element mounted on the sliding member opposite the rigid concave conical element, a convex plunger head mounted on the plunger tube behind the resilient member and adapted upon contact therewith to evert the concave face of the resilient member into a convex face, the resilient member being adapted to engage the concave conical member and be forced against the sliding member during the compression of the fruit.

28. Apparatus for extracting juice from fruit, comprising two relatively movable means between which a whole fruit having a rind may be enclosed and be subjected to compression with substantially its whole surface supported thereby, one of those two means comprising a concave conical element of rigid material fixedly and detachably mounted and a platelike ejecting element engageable with the compressed fruit adjacent the apex of the conical concave element, and having means mounting it for movement in a direction to remove the compressed fruit residue from the concave conical element, an excising device having reciprocating tubular means adapted to pierce and enter through the rind of the fruit and thereby excise a piece of rind and further adapted to place it inside the fruit, the other of the two relatively movable enclosing and compressing means comprising relatively resilient material having on one side a cuplike element adapted to fit inside the concave conical element of the first means and on the opposite side supporting means for mounting said cuplike element for eversion from concave form to convex form, means adapted to evert the cuplike element from concave to convex form when inside the concave conical element, drive mechanism for effecting a relative approaching and separating movement between the two relatively movable enclosing and compressing means and for controlling projecting and retrograde movement of the piercing means relative to the concave conical element, thereby alternately juxtaposing them with the cuplike element fitting inside the concave conical element with the fruit therebetween and spacing them apart to permit ejection of the residue of a compressed fruit before the positioning of another fruit therebetween, a hopper for fruit, means for transferring fruit one by one from the hopper and positioning them between the two relatively movable enclosing and compressing means, coordinating mechanism synchronized with the drive mechanism for actuating the transfer means to position a fruit between the enclosing and compressing means upon projection of the piercing means in position to effect piercing of the fruit rind on one side of the fruit upon relative approaching movement between those two relatively movable means and for effecting retrograde movement of the piercing means upon continuation of such approaching movement after entry thereof into the fruit to avoid piercing the rind on the other side of the fruit, the tubular piercing means having slots effective to convey juice therethrough from the inside of the fruit and to strain out seeds and roughage during compression of the fruit whereby the seeds and roughage remain enclosed within the rind together with the excised piece thereof, an ejecting element having actuating means synchronized with the coordinating mechanism for effecting projecting movement of said piercing means and effective to actuate the ejecting element to remove the fruit residue from the piercing means and eject it from between the concave conical and cuplike elements upon relative separating movement spacing the respective enclosing and supporting means apart.

29. Apparatus for extracting juice from fruit, comprising two relatively movable means between which a whole fruit having a rind may be enclosed and be subjected to compression with substantially its entire surface supported thereby, one of those two means comprising a concave conical element of rigid material, an excising device reciprocably mounted with regard thereto and having piercing means adapted to enter through the rind of the enclosed fruit on the side adjacent the concave conical element, an ejecting element engageable with the compressed fruit on that same side and having means mounting it for movement in a direction to remove the compressed fruit residue from the concave conical element and the vicinity of the piercing means, the other of the two relatively movable enclosing and compressing means comprising relatively resilient material and having on one side a cuplike element adapted to fit inside the concave conical element of the first means, means adapted to evert the cuplike element from concave form to convex form inside the concave conical element, drive mechanism for effecting a relative approaching and separating movement between the two relatively movable enclosing and compressing means and for controlling projecting and retrograde movement of the piercing means relative thereto, thereby alternately juxtaposing the enclosing and compressing means to enclose and compress a fruit therebetween and spacing them apart to permit ejection of the residue of a compressed fruit therefrom, means for transferring fruit one by one from a source of supply and positioning them between the two relatively movable enclosing and compressing means, coordinating mechanism synchronized therewith for effecting piercing of the rind on one side of the fruit upon juxtaposition of the enclosing and compressing means and for thereafter effecting retrograde movement of the piercing means to avoid piercing the rind on the other side of the fruit, the ejecting element having actuating means also synchronized therewith and being effective to remove the fruit remnant from the vicinity of the piercing means and eject it from between the concave conical and cuplike elements upon relative separating movement to space the respective enclosing and supporting means apart.

30. Apparatus for extracting juice from fruit having a rind, comprising a drive motor; a hopper for fruit; transfer means driven by the motor to transfer fruit one by one from the hopper and position them to be compressed; compression means including a rigid concave element having a truncated conical interior surface and a relatively movable resilient concave element having a cylindrical supporting portion and a cuplike portion supported thereby and adapted to fit into and to be everted within the rigid concave element; mounting means for the resilient element including a rigid holding unit having a central bore, having a cylindrical portion contiguous with the interior wall of the resilient supporting portion and with the rear face of the cuplike portion, and having a cylindrical portion contiguous with the exterior wall of the resilient supporting portion, a tube axially reciprocable within the central bore of the holding unit, a plunger on the end of the tube and in contact with the central portion of the rear face of the resilient cuplike portion, a compression spring within the tube, a cylindrical element reciprocable within the tube and located between the end of the tube carrying the plunger and the spring and bearing against the spring, and fastening means securing the rigid holding unit to the reciprocal cylindrical element, the tube being slotted longitudinally to accommodate the fastening means; drive mechanism interconnecting the motor to reciprocate the tube and including a compression spring surrounding the tube and fixed thereto intermediate the ends of the tube and at the end of the spring nearer the end of the tube carrying the plunger, connecting means at the other end of the spring adapted to move it to slide the tube to place the resilient cuplike element within the rigid concave element and to evert it by movement of the plunger against its rear face relative to the holding unit and against the bias of the compression spring within the tube and finally to compress the surrounding spring as the plunger dwells at the limit of its movement, and means interconnecting the connecting means to the motor and adapted to speed up the withdrawing half cycle movement with respect to the advancing half cycle; a plurality of tubular prongs extending from the exterior to the interior of the rigid concave element through bores provided therein near the truncated apex thereof at intervals evenly spaced about the conical axis, with their cutting edge at the ends within the conical interior, mounted for reciprocation parallel to the axis, having a transverse wall near the cutting ends, and having longitudinal slots therethrough spaced closely enough to exclude seeds and roughage; a disc mounted within the rigid concave element on a reciprocable shaft extending to the exterior thereof through a bore provided therein, the disc surrounding the tubular prongs and having fingers extending radially through certain of the longitudinal slots therein, the disc having a first rest position beyond the furthest extent of the cutting ends of the prongs in the direction of withdrawal of the resilient element and having a second rest position adjacent the interior of the truncated apex with the peripheral surface of the disc contiguous with the conical wall of the rigid concave element; bistable means for biasing the disc to its rest positions from an intermediate dead center position at which the tubular prongs project through the disc with their cutting edges engaging a fruit interposed between the rigid and resilient elements and enclosed thereby and supported thereby and by the disc; and coordinating mechanism interconnecting the tubular prongs and the reciprocable tube and adapted to retract the prongs in accordance with the advance of the plunger to prevent the prongs from cutting the rind on the side of the fruit supported by the resilient element and to project the prongs to their furthest extent upon withdrawal of the resilient element after compression of the fruit, and adapted also to actuate the bistable means to bias the disc abruptly from its second to its first rest position to remove the compressed fruit residue from the prongs and eject it from between the rigid and concave elements.

31. An apparatus for extracting juice from fruit, comprising a housing, a rotatable cam gear mounted in the housing having a cam roller on one side and a cam track on the opposite side, a lever arm member fulcrumed at one end in the housing and having a curved channel in which the cam roller operates to give the lever arm a reciprocating movement that slows down during the forward stroke and gives the lever arm dwelling time at the end of the forward stroke, the plunger tube having bearing means mounted in the housing and connecting means at one end to engage the lever arm and impart like reciprocating movement of the lever arm to the plunger tube, a spring-loaded sliding member mounted at the other end of the plunger tube having connecting means to actuate the spring thereof, which is located inside of the plunger tube, a resilient concave face member mounted on the spring-loaded sliding member and a convex plunger head mounted on the plunger tube and located behind the resilient member to transform the concave face of the resilient member into a convex face, when the resilient member engages the concave-conical member and is forced back against the spring-loaded sliding member during the time of compression of the fruit, and a cam lever operated by the cam track in the cam gear and connecting levers and links to impart movement to a fruit feeder plate and a holding and aligning plate.

32. An apparatus as claimed in claim 31 in which the connecting means between the reciprocating lever arm and the plunger tube comprises spring means resting against fixed means on the plunger tube at one end of the spring and a sliding member on the other end, stopping means affixed to the plunger tube for the sliding member to rest on and for keeping the spring means under pressure, adjustable links connecting the sliding member and the lever arm, and sliding bearing means to support the spring-loaded sliding member and the near end of the plunger tube.

33. An apparatus as claimed in claim 31 having means for mounting the operating mechanism on a structural stand enclosed in a casing and provided with a removable container that receives the waste of the fruit and with means for supporting the containers to be filled with juice.

34. An apparatus as claimed in claim 31 provided with electrical contact means adapted to allow the apparatus to continue to run while the resilient member is in contact with the concave-conical member, regardless of the position of any other cut-off electrical contacts, to prevent the resilient member from remaining under pressure when the machine stops.

35. An apparatus for extracting juice from fruit, comprising, in combination, two relatively movable means between which a fruit may be subjected to compression, one of the two means comprising a concave-conical element of rigid material mounted in a detachable steady position, having tube means adapted to enter through the rind of the fruit and having piercing means slidable relative to and within the tube means, ejecting means engageable with the compressed fruit and having means mounting it for movement in a direction to remove the compressed fruit from the region of the tube means and piercing means, the second of the two mentioned relatively movable means comprising an element of relatively resilient material having on one side a cup member for completely enclosing a fruit inside the concave-conical element of the first mentioned relatively movable means, and means on the opposite side for mounting the resilient element including a plunger tube to change the concave form of the cup member of the resilient element to a convex form adapted to fit inside of the concave-conical element, means for transferring fruit one by one from a hopper to the two relatively movable means, a mechanism for effecting a relative approaching and separating movement between the two movable means and for controlling projecting and retrograde movement of the piercing means relative to the tube means, means synchronized with that mechanism for actuating the transfer mechanism to transfer a fruit when the piercing means project from the tube means thereby to effect piercing of the fruit rind on one side of the fruit only upon relative approaching movement between the two relatively movable means and for thereafter effecting retrograde movement of the piercing means to avoid piercing the rind on the other side of the fruit, piercing means having slot means for conveying juice therethrough from the inside of the fruit but preventing seeds and roughage from going through the slot means during compression whereby the seeds and roughage remain inside of the rind, and means synchronized with that latter mechanism for effecting projecting movement of the piercing means and actuation of the ejecting means to remove the fruit remnant from the tube and piercing means upon relative separating movement between the two relatively movable means.

36. An apparatus as claimed in claim 35 in which the second of the two mentioned relatively movable means has the resilient element mounted on a spring-loaded sliding bracket, which in turn is mounted on the plunger tube and is adapted to come to a stationary position with respect to the second mentioned relatively movable means when the resilient element is compressed, together with the fruit, by the plunger tube to change the form of the resilient element from concave to convex form and thereby press the fruit evenly into the concave-conical element.

37. An apparatus as claimed in claim 35, in which the piercing means are mounted firmly on a plate outside the concave-conical element in a position to allow them to slide through the tube means inside of the concave-conical element, the plate having sliding connecting means with spring-loaded bars adapted to keep the piercing means in a projecting position inside of the concave-conical element but make them withdraw when the springs of the bars are compressed by a plunger tube component, which moves the resilient element at the same time, when the resilient element gets very close to the cutting edge of the piercing means, sufficiently to prevent the piercing means from cutting the other side of the fruit; and the piercing means are provided with cutting means to cut plugs out of the rind before piercing the fruit, means for holding the plugs within the piercing means at the time of compression and means for removing the plugs from the piercing means at the same time that the remnant of the fruit is removed from the piercing means, thereby leaving the plugs inside of the rind when the remnant of the fruit is thrown into a waste container.

38. An apparatus as claimed in claim 35 in which the transfer mechanism for transferring fruit from the hopper to the compressing mechanism comprises means for picking fruit from the hopper, means for delivering the fruit to an inclined channel, means for inactivating the apparatus when there is no fruit in the channel, and means for delivering the fruit one by one from the channel to the compressing mechanism synchronously when the movable means that compress the fruit are in appropriate position.

39. An apparatus as claimed in claim 35 having an aligning plate adapted to hold the fruit and center the same in appropriate position to be compressed between the two relatively movable means, means for automatically adjusting the height of the aligning and holding plate by the weight of the fruit to center it adjacent the concave face of the resilient element of the second movable means before it starts to be compressed, and means for moving the aligning plate out of the way to allow the remnant of the fruit to drop into a waste container.

40. An apparatus as claimed in claim 35 in which the ejecting means associated with the concave-conical element is provided with means to remove the remnant of the fruit at the same time as the plugs of the rind, and has means for removing the fruit remnant by snapping action when the resilient element has completely withdrawn.

41. An apparatus as claimed in claim 35 in which the concave-conical element is provided with space between the ejecting means and the bottom of the concave-conical element when the ejecting means rests therein, the tube means having shoulder portions to support the ejecting means in that position, to provide room for the contaminated juice and oil of the rind of the fruit and prevent it from flowing out with the clean juice, and to allow the contaminated juice and oil to run out into a waste container upon ejecting of the remnant of the fruit.

42. An apparatus for extracting juice from fruit as claimed in claim 35 in which the concave-conical element accommodates the piercing means and the ejecting means, and the concave-conical element is slidably mounted on a bracket in the housing, and the second movable means is supported by tube means having spring-loaded bars therein having in turn detachable connecting means with the piercing means in the concave-conical element and adapted to keep the piercing means under spring tension and in extended position, and means for giving snapping action to the ejecting means.

43. An apparatus as claimed in claim 35 provided with a transparent cover adapted to allow the operation of the machine to be observed and protect the squeezing mechanism from dust and flies, and electrical means connected with the electric system of the apparatus and adapted to inactivate the apparatus when the cover is opened.

44. An apparatus for extracting juice from fruit as claimed in claim 35 provided with a detachable juice storage tank, an electrical system controlling the operation of the apparatus, and comprising a container having an inlet port for receiving juice, an outlet port provided with a control valve, an agitator for stirring the juice and homogenizing the pulp in the liquid, means for controlling the level of the juice, and switch means for allowing the agitator to function only when the control valve is open.

45. An apparatus for extracting juice as claimed in claim 44, in which the valve controlling the outlet of the juice, the agitator, and the level control means are adapted to be electrically actuated and are connected electrically to the electric system that operates the apparatus, synchronizing the operation of the various elements, and including also detachable means to mount the tank in appropriate position in the apparatus.

References Cited in the file of this patent

UNITED STATES PATENTS

| | | |
|---|---|---|
| 747,567 | Ostrander | Dec. 22, 1903 |
| 1,922,773 | Maull | Aug. 15, 1933 |
| 2,346,561 | Delay | Apr. 11, 1944 |
| 2,420,680 | Pipkin | May 20, 1947 |
| 2,420,681 | Peterson | May 20, 1947 |
| 2,454,256 | Myers | Nov. 16, 1948 |
| 2,522,800 | Quiroz | Sept. 19, 1950 |
| 2,649,730 | Hait | Aug. 25, 1953 |
| 2,649,731 | Polk et al. | Aug. 25, 1953 |

FOREIGN PATENTS

| | | |
|---|---|---|
| 849,642 | France | Aug. 21, 1939 |